United States Patent
Choudhury

(10) Patent No.: US 9,281,906 B2
(45) Date of Patent: Mar. 8, 2016

(54) SUBSEA POWER AND DATA COMMUNICATION APPARATUS AND RELATED METHODS

(71) Applicant: Hydril USA Manufacturing LLC, Houston, TX (US)

(72) Inventor: Devasish Choudhury, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 470 days.

(21) Appl. No.: 13/731,329

(22) Filed: Dec. 31, 2012

(65) Prior Publication Data

US 2014/0184421 A1    Jul. 3, 2014

(51) Int. Cl.
*H04B 13/02*    (2006.01)
*H02J 7/02*    (2006.01)
*E21B 33/064*    (2006.01)

(52) U.S. Cl.
CPC .............. *H04B 13/02* (2013.01); *E21B 33/064* (2013.01); *H02J 7/025* (2013.01)

(58) Field of Classification Search
None
See application file for complete search history.

(56) References Cited

U.S. PATENT DOCUMENTS

| | | | | |
|---|---|---|---|---|
| 4,092,505 | A  * | 5/1978 | Caviar | 200/38 D |
| 6,500,316 | B1 * | 12/2002 | Fatula, Jr. | H01F 38/18 204/212 |
| 7,711,322 | B2 * | 5/2010 | Rhodes et al. | 455/40 |
| 7,847,671 | B1 | 12/2010 | Riachentsev et al. | |
| 2008/0285379 | A1 * | 11/2008 | Bishop et al. | 367/14 |
| 2009/0194290 | A1 * | 8/2009 | Parks et al. | 166/339 |
| 2010/0183313 | A1 * | 7/2010 | Rhodes et al. | 398/104 |
| 2011/0177779 | A1 * | 7/2011 | Rhodes et al. | 455/40 |
| 2012/0000664 | A1 | 1/2012 | Nas et al. | |

(Continued)

FOREIGN PATENT DOCUMENTS

| | | |
|---|---|---|
| EP | 2518262 A2 | 10/2012 |
| GB | 1100702 A | 1/1968 |

(Continued)

OTHER PUBLICATIONS

International Search Report and Written Opinion issued in connection with corresponding PCT Application No. PCT/US2013/074224 dated Dec. 9, 2014.

*Primary Examiner* — Brian Zimmerman
*Assistant Examiner* — Kevin Lau
(74) *Attorney, Agent, or Firm* — Bracewell LLP

(57) ABSTRACT

Subsea power and data communications apparatus, subsea wireless sensor hubs assemblies, subsea wireless sensor hubs, and methods of providing power to and receiving data from subsea data gathering devices, are provided. An exemplary apparatus can include subsea sensors/gauges, batteries to power the sensors/gauges, charging circuits for controlling charging of the batteries, one or more BOP control pods, an RTU, and a subsea wireless connection hub. The hub can include a stationary wheel carrying wireless stationary connection members each electrically connected to a battery and a respective subset of sensors/gauges. The hub can also include a rotatable wheel carrying a single wireless movable connection member configured to provide power to each of the stationary connection members and to receive data from the stationary connection members. A motor is provided to rotate the rotatable wheel to position the mobile connection member in front of a selected one of the stationary connection members.

23 Claims, 4 Drawing Sheets

(56) References Cited

U.S. PATENT DOCUMENTS

| | | | | |
|---|---|---|---|---|
| 2012/0133468 A1* | 5/2012 | Bedini | ................... | H01F 38/18 336/120 |
| 2012/0153738 A1* | 6/2012 | Karalis et al. | ................. | 307/104 |
| 2012/0175969 A1* | 7/2012 | Maughan et al. | ............. | 307/104 |
| 2013/0069625 A1* | 3/2013 | Gilchrist | ................ | G01R 31/40 324/76.11 |
| 2013/0321223 A1* | 12/2013 | Bokenfohr et al. | ........... | 343/719 |

FOREIGN PATENT DOCUMENTS

| | | |
|---|---|---|
| GB | 2466560 B | 3/2011 |
| GB | 2477034 A | 7/2011 |
| GB | 2481516 A | 12/2011 |
| GB | 2484809 A | 4/2012 |
| WO | 0077918 A1 | 12/2000 |
| WO | WO2005078233 A1 | 8/2005 |
| WO | WO2011014608 A3 | 2/2011 |

\* cited by examiner

SUBSEA POWER AND DATA COMMUNICATION APPARATUS AND RELATED METHODS

BACKGROUND OF THE INVENTION

1. Field of the Invention

This invention relates to wireless power and data communication, and more particularly to apparatus, subsea hub assemblies, and methods of providing power to charge power supplies for data gathering devices and to retrieve data from the data gathering devices.

2. Description of the Related Art

Industry members today are looking for more operating and maintenance data from their subsea systems. Also as a result of an increase in focus on employment and proper functioning of failsafe subsea operations, particularly on blowout preventer (BOP) systems, there is an increase in the requirement for, and utilization of, sensors to monitor primary and backup systems for early failure detection and prevent system failures from occurring.

Providing power to, and retrieving data from these additional sensors or other devices has been a challenge, particularly due to increased sensor needs. Although many subsea sensors can receive a direct electrical connection, various sensors, particularly newly added ones, must be powered by a stored energy device such as a battery. This is because, in some circumstances, there simply is not enough connection slots in the BOP receiver transmitter unit (RTU) for providing a wired electrical source to provide for powering these data gathering devices or for retrieving gathered data.

Adding to the problems, certain sensors, gauges, and other devices may need to be activated multiple times. Such usage, particularly when combined with the self-discharge of batteries, however, can result in a considerable depletion of the batteries' power. Further, wireless data transmission, which can consume considerable amount of power, further complicates power management of the devices.

The options available under normal circumstances is replacement of batteries at fixed intervals or providing batteries that are oversized to enable them to perform over the entire period of deployment. Changing out the batteries, however, generally requires the tasking of a remote operated vehicle (ROV). Particularly in deep water, a considerable amount of time and money can be spent performing something as simple as changing even a relatively small number of batteries. Utilizing oversized batteries can be expensive and can cause significant issues with respect to their placement within the crowded stack space.

SUMMARY OF THE INVENTION

Recognized by the inventor is the need for a methodology of providing power to and retrieving data from multiple subsea data gathering devices such as sensors, gauges, and other such devices, particularly those for BOP, without requiring oversized batteries, frequent battery replacement, or an excessive number of battery charging conduits.

In view of the foregoing, various embodiments of the present invention provide a solution to the challenge of providing the power needed to operate sensors, gauges, and other devices that are powered by stored energy devices such as batteries. Various embodiments of the present invention utilize wireless technology in order to transfer power and data subsea. Various embodiments can be utilized to charge and operate multiple battery operated sensors/devices with a single or limited number of available power sources, and to simultaneously collect data generated by them for transmission to the surface. This advantageously provides enhanced control of the subsea system. Various embodiments also allow the operator to access operating data from the sensors/devices, and to use it to diagnose early signs of failure and to prevent such failure from occurring.

Various embodiments advantageously allow the customer to operate a larger number of devices with the in situ power available, to reduce costs by optimizing the battery size, and to eliminate the need for surface intervention to frequently change batteries. Through the provision of a dependable supply of electrical power, various embodiments allow the batteries to be sized for a limited number of activation cycles, and for recharging them when depleted, without surface intervention. With the subsea sensor hub system, certain aspects such as, for example, the sensors, gauges, and subsea battery with charging circuit can be tailored for a particular subsea system, including subsea BOP systems.

Various embodiments of the present invention advantageously provide subsea power and data communication apparatus, subsea wireless hub assemblies and hubs, and methods of providing power to charge power supplies for multiple subsea data gathering devices and retrieve data from the multiple subsea data gathering devices through utilization of a limited number of wireless non-contact movable power transmitting and data retrieving devices.

An example of an embodiment of such an apparatus can include a plurality of data gathering devices such as, for example, sensors, gauges, or other devices configured to gather data, a power source including one or more of a pair of blowout preventer control pods, a remote terminal unit electrically operably coupled with the pair of blowout preventer control pods, and a plurality of power supply members. Each of the power supply members include a power storage device and a charging circuit. The power storage device, typically a battery, electrically coupled to one or more of the plurality of data gathering devices, can be co-located with its associated data-gathering device or is co-located with the charging circuit.

The apparatus also includes a subsea wireless connection hub forming part of a subsea wireless connection hub assembly. The subsea wireless connection hub includes a plurality of substantially spaced apart wireless non-contact stationary connection members each operably electrically coupled with a different one of the plurality of power supply members, carried by a static member typically in the form of a stationary mounting wheel. The subsea wireless connection hub can also include one or more wireless non-contact movable connection members configured to be operably electrically coupled with the remote power source. The movable connection member or members are also configured to wirelessly provide electrical power to adjacent ones of the plurality of stationary connection members and to wirelessly receive gathered data therefrom when positioned adjacent thereto at a minimum distance or "gap" using inductive transfer technology. The movable connection member or members are carried by a non-static member typically in the form of a rotatable mounting wheel.

The rotatable mounting wheel can include or is connected with a motor configured to rotate the mounting wheel to selectively position the movable connection member or members adjacent to and in power transfer and data communication range with a corresponding one or more of the plurality of stationary connection members. The motor is also configured to rotate again to position the movable connection member or members adjacent to and in power transfer and data communication range of one or more other of the plurality of stationary connection members after charging of the first set is complete. A controller provides control of the motor.

In order to provide protection to the mounting wheel and motor components, the subsea wireless hub can include an enclosure containing: a dielectric fluid, the stationary connection members, the stationary mounting wheel, the movable connection member or members, and the rotatable mounting wheel.

An example of a method of providing power to charge power supplies for multiple subsea data gathering devices and retrieve data from the multiple subsea data gathering devices through utilization of a limited number of wireless non-contact movable power transmitting and data retrieving devices, includes the step of providing a remote subsea terminal unit and a subsea wireless connection hub such as, for example, that described above. The method also includes the steps of operably coupling each of the plurality of stationary (power receiving) connection members with a corresponding plurality of power supply members each powering one or more of a plurality of data gathering devices, and operably coupling the remote terminal unit to the movable (power-transferring) contact member or members and to one or more of the pair of blowout preventer control pods. The method can also include rotating the rotatable mounting wheel to selectively position one or more movable connection members adjacent to and in power transfer and data communication range with a corresponding one or more of the plurality of stationary connection members. The method also includes rotating the rotatable mounting wheel again to position the connection member or members adjacent to and in power transfer and data communication range of one or more other of the plurality of stationary connection members.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Various embodiments of the present invention advantageously provide subsea power and data communication apparatus, subsea wireless sensor hubs and hub assemblies, and methods of providing power to charge power supplies for subsea data gathering devices. Various embodiments also provide for retrieving data from the subsea devices utilizing a limited number of wireless non-contact movable power transmitting and data receiving devices. According to various embodiments, the subsea wireless sensor hubs allow the use of a single or otherwise limited number of power sources to charge and operate multiple sensors and other devices, including those with display gauges, subsea. According to various embodiments, the subsea wireless sensor hubs also or alternatively collect incoming data from the sensors/devices and transmit the data through a single point. In a blowout preventer (BOP) environment, power can advantageously be drawn from a remote terminal unit (RTU), which is in electrical communication with the blue and/or yellow pod of the BOP. Various embodiments are beneficially adapted to be used for other subsea applications where there is a requirement to operate multiple devices having rechargeable power supplies and a power source available to power them.

Figure 1:
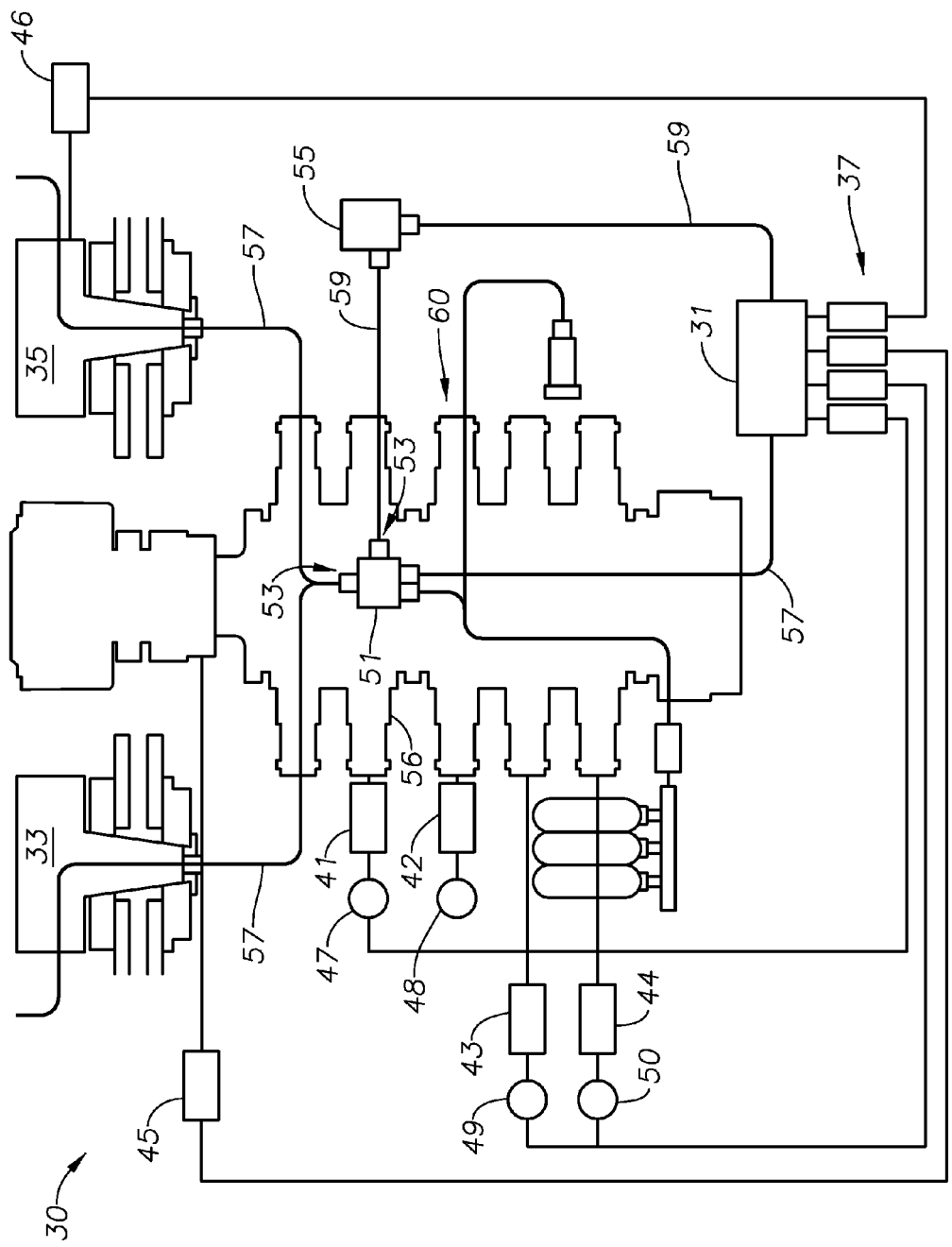
FIG. 1 is a partial environmental schematic diagram of a general system architecture of an apparatus for providing power to charge a plurality of power supply members according to an embodiment of the present invention.
Figure 2:
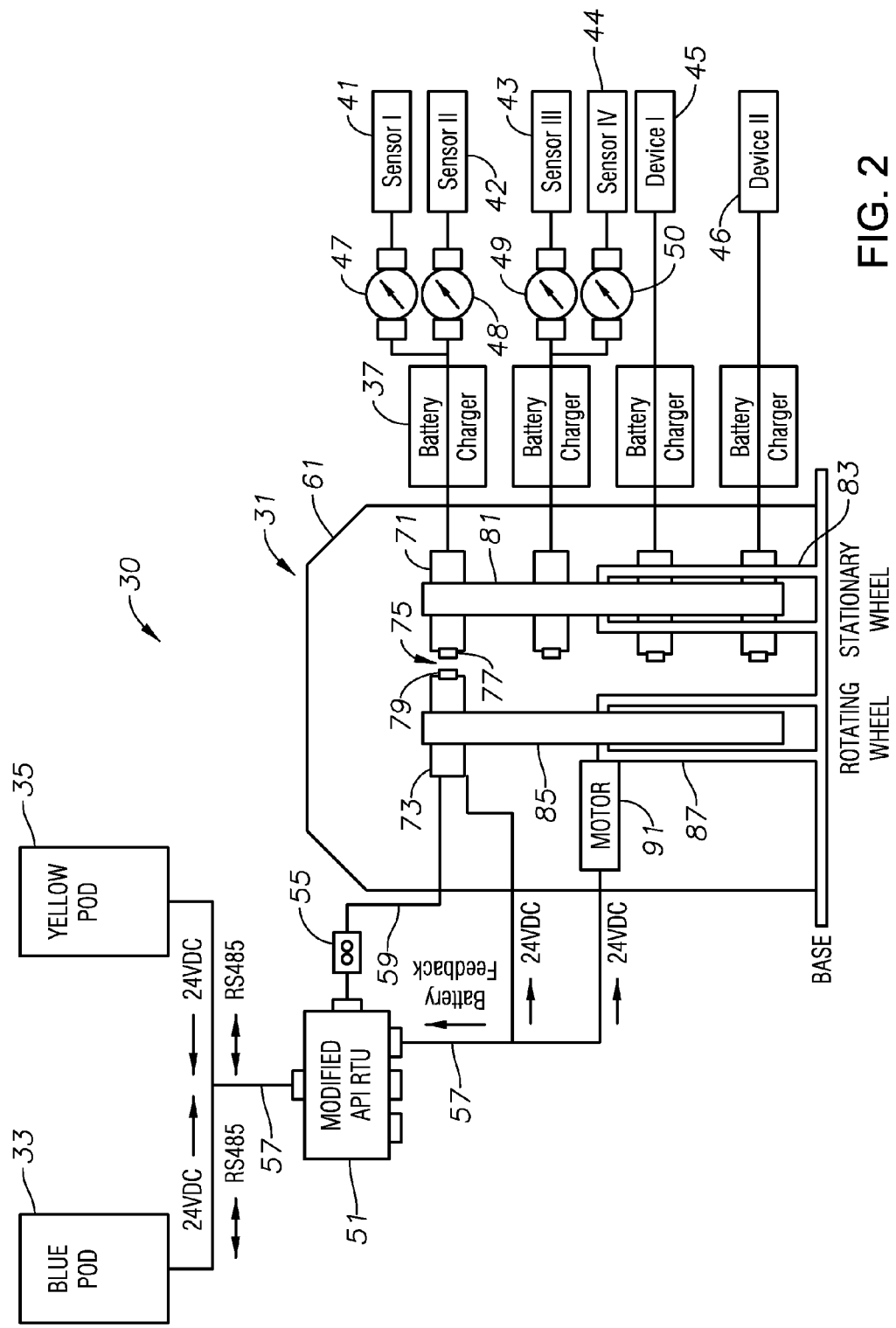
FIG. 2 is a schematic diagram of a general system architecture of substantial portions of the apparatus of FIG. 1 according to an embodiment of the present invention.

FIG. 1 illustrates an apparatus 30 including the subsea wireless connection hub 31 for providing power from a remote power source such as, for example, one or both BOP pods 33, 35 through RTU 51, to charge a plurality of power supply members 37 providing power, e.g., 24 VDC, to multiple subsea data gathering devices, e.g., sensors 41-46, and gauges 47-50 (see also FIG. 2) and to retrieve data from them and send it back to the surface through RTU 51 and Pod 33 and 35. FIG. 2 illustrates substantial portions of the apparatus 30 to include details of the inner structure of the subsea wireless connection hub 31.

Referring primarily to FIG. 1, according to the illustrated exemplary configuration, power and communications is routed through RTU 51. In the illustrated embodiment, the RTU 51 has been modified to include one or more additional connector terminals 53. Communications can also or alternatively be provided through a data acquisition unit (DAU) 55 connected, for example, between the subsea wireless connection hub 31 and RTU 51. One or more suitable electrical conductors 57 connect between the RTU 51 and the subsea wireless connection hub 31, and between the RTU 51 and one or both of the BOP pods 33, 35. Similarly, suitable electrical or electro-optical conductors 59 connect between the DAU 55 and the subsea wireless connection of 31 and between the DAU 55 and the RTU 51 or, alternatively, directly with the one or both BOP pods 33, 35.

According to the exemplary configuration, the illustrated sensors 41-46 and gauges 47-50 and/or additional sensors/gauges or other data gathering devices function to continuously/intermittently collect data. They may also or alternatively function when activated by pre-determined conditions. For example, one of the devices could be in the form of a pressure gauge 47 that monitors the pressure of one of the BOP chambers 56. According to various other configurations, the device could be a level switch that is self-activated to fill a tank (not shown) when empty and switches off when the tank is full. Also or alternatively, the device could be a backup device which activates a certain function when the primary method of activation fails to activate.

Referring primarily to FIG. 2, according to the exemplary configuration, each of the sensors 41-46, gauges 47-50, or other devices (not shown) are equipped with their own battery or other energy storage-type power source collectively referred to as "battery" (not separately shown). Each battery can be sized based on their respective power requirements to perform their individual functions. Alternatively, the battery could be sized and positioned to power a group of sensors or other devices that can be operated through a single battery such as when the power requirements for the particular assigned function is low. Each of the batteries can be co-located adjacent to or within the respective enclosure of their respective sensors 41-46, gauges 47-50, or other devices, or co-located adjacent to or within the respective enclosure of an associated charging circuit of one of the power supply members 37, described in more detail below.

According to the exemplary configuration, each battery will be equipped with an individualized charger typically contained within an enclosure of the respective power supply member 37, which can determine the rate at which the battery is to be charged and control the start and shut off for the battery charging. The battery charging can be set to start when the power level falls below a certain level (e.g., say 70%), and continue until the battery is recharged. According to the exemplary configuration, the battery charger will interrupt power to the battery when the battery is fully charged to prevent overcharging. The charging rate, start and stop for each battery can be controlled by a battery charger circuit board, which can be preset before deployment. The battery charger circuit board can send a feedback signal regarding the battery power level of the respective battery through the subsea control systems to surface control systems.

According to the exemplary configuration, if data is to be collected from the respective associated sensor, gauge, or other device or devices, e.g., devices 41-50, it can beneficially be transferred simultaneously when the battery is being charged. The sensor or other device data can be in the form of an addressable RS485 signal transmitted to the surface either through the same connector 53 on the modified API RTU 51 and conductor 57 providing the power transfer, and/or through a different RTU like the DAU 55.

The power supply members 37 including charging equipment, subsea wireless sensor hub 31, one or more of the sensors 41-50, and certain other equipment, can be housed separately or together on a sturdy frame that can be attached to the BOP stack 60.

According to the exemplary configuration, the subsea wireless sensor hub 31 includes wireless non-contact movable and stationary connection members 73, 71, contained within an enclosure 61 to protect them from the elements for proper functioning. Power supplied and the sensor/gauge data obtained from the sensors 41-46 and gauges 47-50 can be transmitted through the connection members 71, 73. The connection members 71, 73, can be of a form similar to the wireless connectors which form a module manufactured and sold under the trade name SeaPAR® by WFS technologies, which can transmit both power and data wirelessly through a small gap between non-contacting terminal portions using inductive transfer technology, e.g., of 20 mm or less in seawater. A module can beneficially provide up to approximately 200 W power transfer and a wireless data rate of up to 1 Mbps. Other modules having a similar structure and function are, of course, within the scope of the present invention.

The stationary connection members 71 are each configured to be operably electrically coupled with one or more of the data gathering devices 41-50 through the power supply members 37. The stationary connection members 71 are carried in a configuration by a static member typically in the form of a stationary mounting wheel 81 supported at its midsection by a supporting bracket 83.

The movable connection member 73 is configured to be operably electrically coupled with one or both of the BOP pods 33, 35 thru RTU 51. The movable connection member 73 is also configured to selectively wirelessly provide electrical power to the plurality of stationary connection members 71 and and/or selectively receive gathered data from them when positioned adjacent to the respective stationary connection member 71, and when a minimum gap 75 is established between connection terminals 77, 79. The gap distance requirement, typically ranging between approximately 10 mm and 50 mm, is determined by the type of dielectric fluid contained within the enclosure 61. Note, the number of static connection members 71 can and typically will significantly outnumber the number of movable connection members 73.

Figure 3:
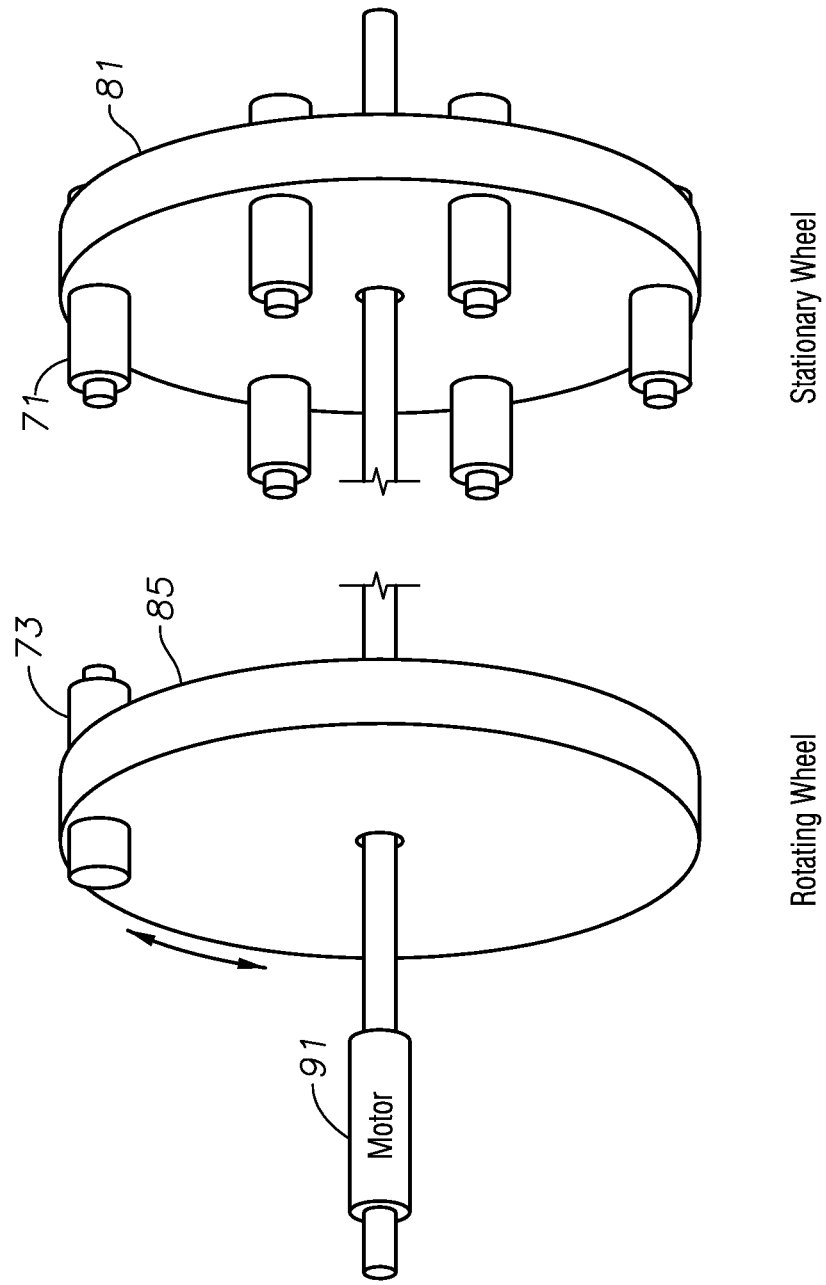
FIG. 3 is a partially exploded perspective view of a portion of a subsea wireless hub contained within an enclosure shown in FIG. 2 according to an embodiment of the present invention.

Also referring to FIG. 3, in order to establish the requisite minimum gap 75 between terminals 77, 79, to thereby allow power and data transfer, the subsea wireless sensor hub 31 can include a non-static member in the form of a rotatable mounting wheel 85. The rotatable mounting wheel 85 is supported at its midsection by a supporting bracket 87, and is oriented in a plane parallel to and spaced apart from to the plane associated with stationary mounting wheel 81. In this configuration, static and movable connection members 71, 73, are correspondingly oriented normal to the respective planes of the mounting wheels 81, 85, to allow for individual selective alignment. Note, the rotatable mounting wheel 85 can carry an oppositely positioned movable connection member 73 (not shown) to improve the balance of the rotatable mounting wheel 85 and to provide enhanced charging ability and data download.

A motor 91 is employed to rotate the mounting wheel 85 to selectively align the movable connection member 73 with one of the stationary connection members 71 to thereby allow for checking the power level of battery powering an associated sensor or sensors (e.g., sensors 41, 42), recharging the battery, and receiving and forwarding the data collected by the respective sensor or sensors. After charging, the motor 91 is then employed to rotate again to selectively align the movable connection member 73 with another of the stationary connection members 71 coupled with a next sensor or set of sensors (e.g., sensors 43, 44) requiring power. When two different batteries associated with two different sets of sensors/gauges need to be charged at the same time, the rotatable mounting wheel 85 can be rotated to alternate between the two positions of the two separate associated stationary connection members 71 every "x" minutes until both batteries have been recharged.

A controller (not shown) located in one of the BOP pods 33, 35, in conjunction with a controller located on the surface (not shown) can pre-provide instructions to perform such logical steps. Alternatively, the surface controller can provide on-demand control of the motor 91 according to a typically pre-selected/determined schedule or through direct real-time user input.

According to the exemplary configuration, the motor 91 can receive power, e.g., 24 VDC, for example, via a tap into, or split from the electrical conductor 57 connecting between the RTU 51 and the subsea wireless connection hub 31. Alternatively, the motor 91 can receive power through a separate conductor extending between the RTU 51 and the subsea wireless sensor hub 31, which can be partially run with the former. Various other configurations as understood by those of ordinary skill in the art are within the scope of the present invention.

Figure 4:
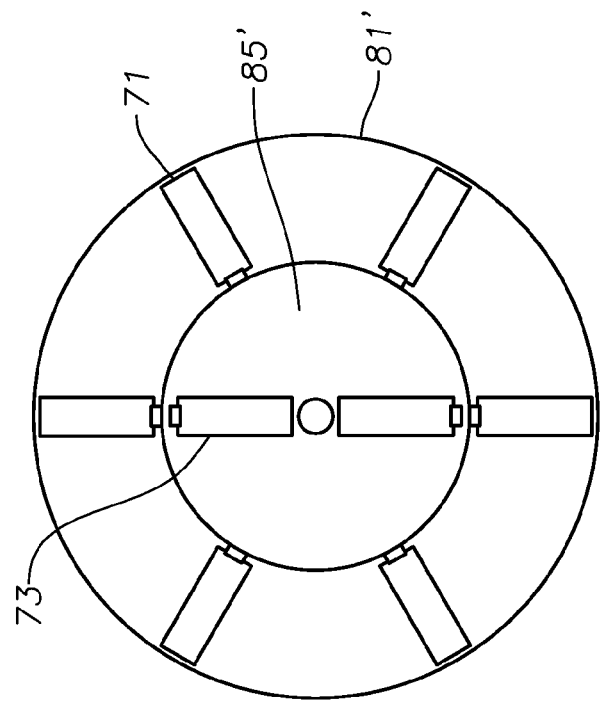
FIG. 4 is a schematic diagram of a portion of a subsea wireless hub according to an embodiment of the present invention.

Referring to FIG. 4, according to an alternative embodiment, a stationary mounting wheel 81' and rotatable mounting wheel 85' are positioned in a plane parallel to and coplanar with each other.

Figure 5:
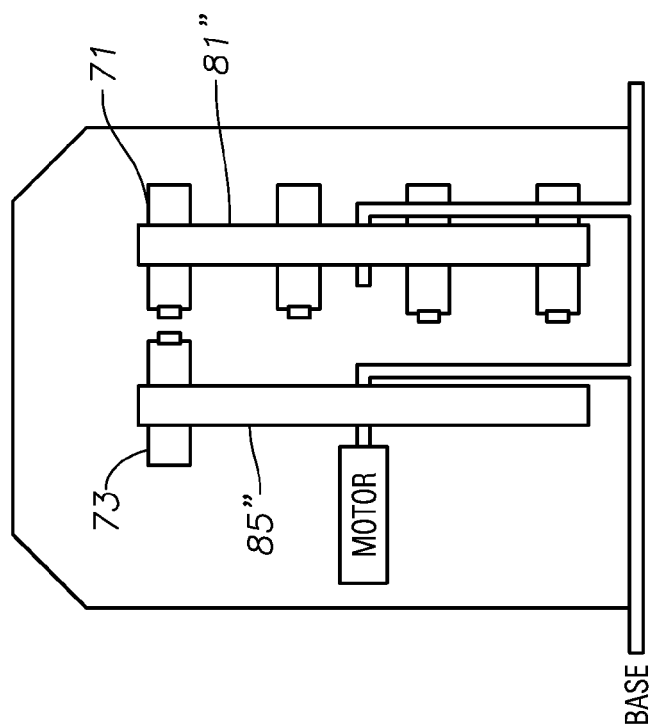
FIG. 5 is a schematic diagram of a portion of a subsea wireless hub according to an embodiment of the present invention.

Referring to FIG. 5, according to another alternative embodiment, the static and non-static members 81", 85", can take the form of a pair of parallel, spaced apart vertical frames, whereby the movable connection member 73 can be moved linearly to selectively align with each of the linearly positioned stationary connection members 71. The arrangement could be placed horizontally or at an angle between horizontal and vertical too depending on space availability.

Various embodiments of the present invention provide several advantages. For example, various embodiments provide an efficient system of providing power from a single source to multiple sensors/devices that may or may not be operating continuously. Various embodiments can tap energy from a typically continuous power source at a predetermined rate to charge the batteries and keep the sensors/devices active at all times without affecting normal operations. Certain devices/sensors may need to be activated multiple times. Such requirement in combination with the normal self-discharge of batteries can deplete the power source considerably. The options available under normal circumstances is replacement of batteries at fixed intervals or providing batteries that are oversized to enable them to perform over the entire period of deployment. Various embodiments allow the batteries to be sized for a limited number of activation cycles and for recharging them before being depleted without surface intervention. Various embodiments also provide for the collection of data from the sensors/devices and transmitting the data to the surface so that surface operators can better monitor and control the subsea system. Various embodiments provide for the operation of a higher number of devices simultaneously compared to the number that could be operated by connecting them directly to a common subsea power source. Advantageously, various embodiments can be configured for different types of subsea systems that employ remotely positioned electrically powered devices that use stored electrical power.

Various embodiments provide more operating and maintenance data from their subsea systems through the employment of additional sensors to monitor subsea components and backup devices to thereby prevent failures. Various embodiments provide a solution to the challenge of providing power for increased sensor needs. Various embodiments allow the customer to operate a larger number of devices with the in situ power available. Various embodiments can reduce operating costs by optimizing the battery size of batteries which provide the power for the sensors or other devices, and can advantageously eliminate the need to frequently change out batteries and save time and money.

Various embodiments provide the operator a means to access operating data from the sensors/devices and use it to diagnose early signs of failure and to prevent it. Various embodiments include deployment of sensors, gauges, and subsea batteries with charging circuit tailored to the specific system. The sensors/devices can be used subsea for maintenance and as a backup to conventional/regular instrumentation. Various embodiments can transfer power and simultaneously wirelessly retrieve maintenance related and other data.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A subsea wireless connection hub, comprising:
   a plurality of substantially spaced apart wireless non-contact stationary connection members each configured to be operably electrically coupled with a different one of a plurality of data gathering devices;
   a static member carrying the plurality of stationary connection members;
   one or more wireless non-contact movable connection members configured to be operably electrically coupled with a remote power source and configured to perform one or more of the following functions: selectively wirelessly provide electrical power to adjacent ones of the plurality of stationary connection members and selectively wirelessly receive gathered data therefrom when adjacent thereto; and
   a non-static member carrying the one or more movable connection members and configured to provide for selective positioning the one or more movable connection members adjacent to and in power transfer and data communication range of a selected one or more of the plurality of stationary connection members, wherein the static member and non-static member are affixed to a base proximate one another within an enclosure.

2. The subsea wireless connection hub as defined in claim 1, wherein the one or more wireless non-contact movable connection members carried by the non-static member comprise substantially less wireless non-contact movable connection members than the plurality of wireless non-contact stationary connection members carried by the static member.

3. The subsea wireless connection hub as defined in claim 2, further comprising:
   a plurality of the wireless non-contact movable connection members;
   wherein the non-static member carries the plurality of wireless non-contact movable connection members.

4. The subsea wireless connection hub as defined in claim 1, wherein the plurality of wireless non-contact stationary connection members are configured to receive power from and to provide sensor data to one or more of the one or more movable connection members, the subsea wireless connection hub further comprising:
   a motor operably connected to the non-static member, the motor configured to move at least portions of the non-static member to thereby selectively position the one or more wireless non-contact movable connection members adjacent to and in power transfer and data communication range of a corresponding one or more of the plurality of stationary connection members, and to move again to position the one or more movable connection members adjacent to and in power transfer and data communication range of one or more other of the plurality of stationary connection members.

5. The subsea wireless connection hub as defined in claim 4, wherein the static member is a stationary mounting wheel, wherein the non-static member is a rotatable mounting wheel, and wherein the motor is configured to rotate the rotatable mounting wheel to thereby selectively position the one or more wireless non-contact movable connection members adjacent to and in power transfer and data communication range with a corresponding one or more of the plurality of wireless non-contact stationary connection members, and to rotate the rotatable mounting wheel again to position the one or more movable connection members adjacent to and in power transfer and data communication range of one or more other of the plurality of stationary connection members.

6. The subsea wireless connection hub as defined in claim 5, wherein the stationary mounting wheel and rotatable mounting wheel are positioned within the enclosure, wherein the enclosure contains a dielectric fluid, parallel to each other, and oriented in separate spaced-apart planes, and wherein the one or more movable connection members and the plurality of wireless non-contact stationary connection members are of an elongate configuration having main axes oriented normal to the respective planes.

7. The subsea wireless connection hub as defined in claim 5, wherein the stationary mounting wheel and rotatable mounting wheel are positioned within the enclosure, wherein the enclosure contains a dielectric fluid, in a coplanar configuration, and wherein the one or more movable connection members and the plurality of wireless non-contact stationary connection members are of an elongate configuration having main axes oriented parallel to the respective plane.

8. The subsea wireless connection hub as defined in claim 4, wherein the plurality of wireless non-contact stationary connection members are positioned in a row, parallel to each other, and wherein the one or more movable connection members are positioned to translate along a longitudinal axis of the non-static member.

9. A subsea wireless connection hub assembly, the subsea wireless connection hub assembly comprising:
a plurality of data gathering devices configured to gather data;
a plurality of power supply members each comprising a power storage device and a charging circuit, each power supply member electrically coupled to one or more of the plurality of data gathering devices; and
a subsea wireless connection hub, the subsea wireless connection hub comprising:
a plurality of substantially spaced apart wireless non-contact stationary connection members each operably electrically coupled with a different one of the plurality of power supply members;
a static member carrying the plurality of stationary connection members;
one or more wireless non-contact movable connection members configured to be operably electrically coupled with a remote power source and configured to perform one or more of the following functions: wirelessly provide electrical power to adjacent ones of the plurality of stationary connection members and wirelessly receive gathered data therefrom when adjacent thereto; and
a non-static member carrying the one or more movable connection members and configured to provide for selective positioning the one or more movable connection members adjacent to and in power transfer and data communication range of a selected one or more of the plurality of stationary connection members, the one or more movable connection members carried by the non-static member comprising substantially less movable connection members than the plurality of stationary connection members carried by the static member, wherein the static member and non-static member are affixed to a base proximate one another within an enclosure, and wherein the static member and non-static member are supported by support brackets at their respective mid-sections.

10. The subsea wireless connection hub assembly as defined in claim 9, further comprising:
a plurality of the wireless non-contact movable connection members;
wherein the non-static member carries the plurality of wireless non-contact movable connection members; and
wherein the plurality of wireless non-contact movable connection members carried by the non-static member comprises substantially less wireless non-contact movable connection members than the plurality of wireless non-contact stationary connection members carried by the static member.

11. The subsea wireless connection hub assembly as defined in claim 9, further comprising:
a remote terminal unit operably electrically coupled to the remote power source and the one or more wireless non-contact movable connection members to receive data therefrom and to provide power thereto.

12. The subsea wireless connection hub assembly as defined in claim 9, further comprising:
a remote terminal unit operably electrically coupled to a motor to provide power thereto to rotate the non-static member.

13. The subsea wireless connection hub assembly as defined in claim 9, wherein the plurality of wireless non-contact stationary connection members are configured to receive power from and to provide sensor data to one or more of the one or more movable connection members, wherein the static member is a stationary mounting wheel, wherein the non-static member is a rotatable mounting wheel, and wherein the subsea wireless connection hub assembly further comprises:
a motor operably connected to the non-static member, the motor configured to rotate the rotatable mounting wheel to thereby selectively position the one or more wireless non-contact movable connection members adjacent to and in power transfer and data communication range with a corresponding one or more of the plurality of stationary connection members, and to rotate the rotatable mounting wheel again to position the one or more movable connection members adjacent to and in power transfer and data communication range of one or more other of the plurality of stationary connection members.

14. The subsea wireless connection hub assembly as defined in claim 13, wherein the stationary mounting wheel and rotatable mounting wheel are positioned within the enclosure, wherein the enclosure contains a dielectric fluid, parallel to each other, and oriented in separate spaced-apart planes, and wherein the one or more movable connection members and the plurality of wireless non-contact stationary connection members are of an elongate configuration having main axes oriented normal to the respective planes.

15. The subsea wireless connection hub assembly as defined in claim 13, wherein the remote power source comprises one or more blowout preventer pods, the subsea wireless connection hub assembly further comprising:
a remote terminal unit operably electrically coupled to one or more of the one or more blowout preventer pods and the one or more wireless non-contact movable connection members to receive data therefrom and to provide power thereto, and operably coupled to the motor to provide power thereto to rotate the non-static member.

16. The subsea wireless connection hub assembly as defined in claim 9, further comprising:
a motor configured to rotate the non-static member;
a remote terminal unit operably electrically coupled to the remote power source and the one or more wireless non-contact movable connection members to receive data therefrom and to provide power thereto, and operably electrically coupled to the motor to provide power thereto to rotate the non-static member; and a data acquisition unit in communication with the one or more wireless non-contact movable connection members and the remote terminal unit or the remote power source, or the one or more movable connection members and both the remote terminal unit and the remote power source to thereby provide an alternative communications pathway.

17. The subsea wireless connection hub assembly as defined in claim 9, further comprising:

a motor configured to rotate the non-static member;

a remote terminal unit operably electrically coupled to the remote power source and the one or more wireless non-contact movable connection members to receive data therefrom and to provide power thereto, and operably electrically coupled to the motor to provide power thereto to rotate the non-static member; and a controller configured to cause the motor to rotate to control positioning of the one or more wireless non-contact movable connection members.

18. A subsea power and data communication apparatus, comprising:

a plurality of data gathering devices configured to gather data;

a plurality of power supply members each comprising a power storage device and a charging circuit, each power supply member electrically coupled to one or more of the plurality of data gathering devices;

a power source comprising one or more of a pair of blowout preventer control pods;

a remote terminal unit electrically operably coupled with the pair of blowout preventer control pods; and a subsea wireless connection hub, the subsea wireless connection hub comprising:

a plurality of substantially spaced apart power-receiving members each operably electrically coupled with a different one of the plurality of data gathering devices, a static member carrying the plurality of power-receiving members, a wireless non-contact power-transferring member operably electrically coupled with the remote terminal unit, and a non-static member carrying the power-transferring member and configured to provide for separately positioning the power-transferring member adjacent and in power transfer and data communication range of each of the plurality of power-receiving members, wherein the static member and non-static member are affixed to a base proximate one another within an enclosure.

19. A method of providing power to charge a plurality of power storage devices providing power to a plurality of subsea data gathering devices and to retrieve data therefrom utilizing a plurality of power-receiving members operably coupled thereto and a limited number of wireless non-contact movable power transmitting and data receiving devices selectively positionable in communication therewith, the method comprising the steps of:

providing a remote subsea terminal unit and subsea wireless connection hub, the subsea wireless connection hub containing a static member carrying a plurality of power-receiving members, a non-static member carrying one or more wireless non-contact power-transferring members, and a motor for positioning the one or more wireless non-contact power-transferring members into power transferring and data receiving communication range of a corresponding one or more of the plurality of power-receiving members, wherein the static member and non-static member are affixed to a base proximate one another within an enclosure, and wherein the static member and non-static member are supported by support brackets at their respective midsections;

operably coupling each of the plurality of power receiving members with a corresponding plurality of power supply members each powering one or more of a plurality of data gathering devices;

operably coupling the remote terminal unit to the one or more wireless non-contact power-transferring member and to one or more blowout preventer control pods;

rotating at least portions of the non-static member to selectively position the one or more wireless non-contact movable connection members adjacent to and in power transfer and data communication range of a corresponding one or more of the plurality of wireless non-contact stationary connection members; and rotating the at least portions of the non-static member again to position the one or more movable connection members adjacent to and in power transfer and data communication range of one or more other of the plurality of stationary connection members.

20. The method as defined in claim 19, wherein the one or more wireless non-contact movable connection members carried by the non-static member comprise substantially less non-contact movable connection members than the plurality of wireless non-contact stationary connection members carried by the static member.

21. The method as defined in claim 19, wherein the step of rotating at least portions of the non-static member is initiated by a controller monitoring or calculating a power level of the each power storage device of the plurality of power supply members to thereby charge a respective one or more of the power storage devices.

22. The subsea wireless connection hub as defined in claim 1, wherein the static member and non-static member are supported by support brackets at their respective midsections.

23. The subsea power and data communication apparatus as defined in claim 18, wherein the static member and non-static member are supported by support brackets at their respective midsections.

* * * * *